United States Patent [19]

Goldberg

[11] 4,047,819

[45] Sept. 13, 1977

[54] APPARATUS FOR MEASURING OPTICAL DENSITY WITH STRAY LIGHT COMPENSATION

[75] Inventor: Paul R. Goldberg, Palo Alto, Calif.

[73] Assignee: Smith Kline Instruments, Inc., Sunnyvale, Calif.

[21] Appl. No.: 566,928

[22] Filed: Apr. 10, 1975

[51] Int. Cl.² .................. G01N 21/22; G01J 3/42; G01J 1/42

[52] U.S. Cl. .................. 356/205; 250/565; 356/88; 356/93; 356/94; 356/96; 356/223; 356/229

[58] Field of Search ............ 356/88, 93, 94, 95, 356/96, 97, 98, 201–206, 223, 226, 227, 229; 250/565; 328/111, 127, 145, 147; 307/235 N, 235 B, 234

[56] References Cited

U.S. PATENT DOCUMENTS

| | | | |
|---|---|---|---|
| 3,448,290 | 6/1969 | Newcomb, Jr. | 328/111 |
| 3,506,848 | 4/1970 | Beurrier | 307/234 |
| 3,512,889 | 5/1970 | Liston | 356/94 |
| 3,528,749 | 9/1970 | Bowker | 356/223 |
| 3,664,744 | 5/1972 | Liston | 356/88 |
| 3,691,473 | 9/1972 | Boatwright | 328/145 |
| 3,733,137 | 5/1973 | Badessa | 356/93 |
| 3,765,776 | 10/1973 | Bravenec | 356/202 |
| 3,765,778 | 10/1973 | Bey et al. | 356/202 |
| 3,795,918 | 3/1974 | Sunderland | 356/88 |
| 3,805,046 | 4/1974 | Magnussen, Jr. | 328/145 |
| 3,849,706 | 11/1974 | Johnson et al. | 328/145 |

*Primary Examiner*—Vincent P. McGraw

[57] ABSTRACT

Apparatus for measuring the optical density of a sample includes a dual beam spectrophotometer producing sample and reference signals which are compared with the discharge curve of a resistive-capacitive circuit to provide start-stop signals, the time interval between the two signals being indicative of optical density. Embodied within this linearization means is a novel method of correcting for nonlinearities due to stray light. The start and stop signals are used to drive a linear ramp generator, the stop signal terminating the ramp at an analog signal level indicative of optical density.

8 Claims, 6 Drawing Figures 4,047,819

APPARATUS FOR MEASURING OPTICAL DENSITY WITH STRAY LIGHT COMPENSATION

BACKGROUND OF THE INVENTION

The present invention relates to an apparatus for measuring optical density and, more particularly to such apparatus which produces a direct analog voltage output.

Apparatus for measuring optical density may also be characterized as a spectrophotometer. In general, spectrophotometers of the present type include a light source which provides a reference signal and a sample signal and compares the two resultant signals with the discharge voltage of an RC circuit. The time lapse between the two compare indications corresponds to the density of the sample. Thereafter, as typically shown by Liston U.S. Pat. No. 3,664,744 and Bowker U.S. Pat. No. 3,528,749, a digital counting technique is utilized to determine the time interval between the sample and reference compare indications.

However, many times it is desirable to provide an analog signal readout which is directly proportional to optical density. A digital counter output can, of course, be converted to an analog voltage, but only with excessive added circuit complexity and cost.

OBJECT AND SUMMARY OF THE INVENTION

It is an object of the present invention to provide apparatus for measuring the optical density of a sample which provides a direct analog output signal directly proportional to optical density, while maintaining the circuit simplicity of the overall apparatus.

In accordance with the above object, there is provided apparatus for measuring the optical density of a sample which includes electro-optical means for measuring the light attenuating properties of the sample and producing a sample signal indicative of the attenuation. Such means include a radiation source and detector to detect radiation transmitted through the sample. Reference means provide a reference signal and include means for detecting radiation from the source. A resistive-capacitive circuit includes charging means. Comparing means compare the reference and sample signals with the exponential discharge voltage of the resistive-capacitive circuit for producing start and stop signals respectively, the time interval between such signals being indicative of the optical density of the sample. Linear ramp generator means generate an analog voltage ramp and are responsive to the start signal for initiating the ramp and to the stop signal for terminating the ramp, the termination level being indicative of the optical density of the sample.

Also in accordance with a more detailed concept of the invention sample signal offset means allow for the correction of nonlinearities caused by stray light.

DETAILED DESCRIPTION OF THE PREFERRED EMBODIMENT

Figure 1:
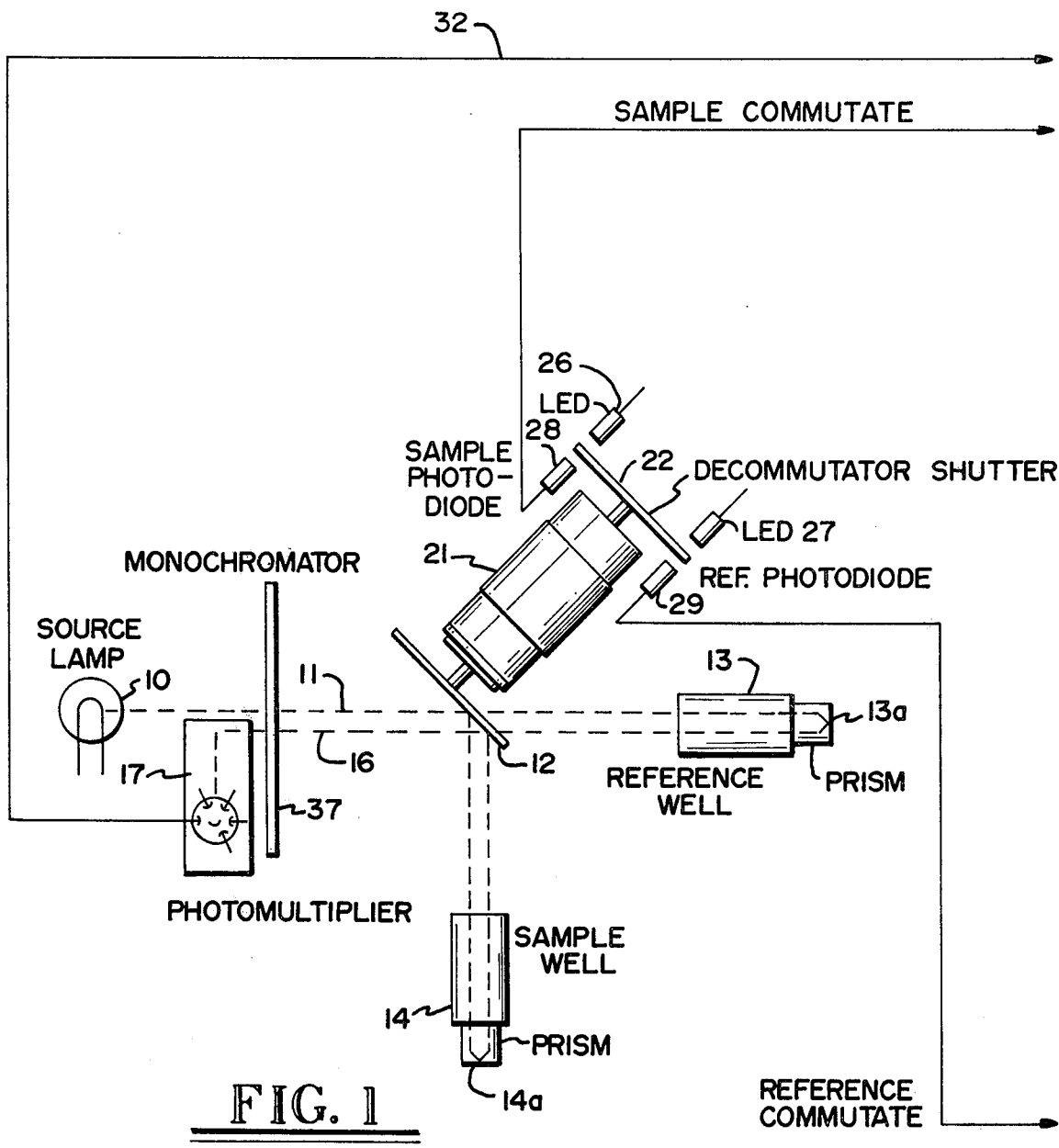
FIG. 1 illustrates the optical arrangement embodying the present invention.

In the optical arrangement shown in FIG. 1, a source lamp 10 produces a beam 11 which is directed by a beam multiplexer 12 alternately toward a reference well 13 or a sample well 14. Well 13 has an end prism 13a, and well 14 an end prism 14a to reflect incident light through either a reference filter (an air reference is most often used) or the sample to be measured and return it by the beam 16 to photomultiplier or detector 17.

Figure 1A:
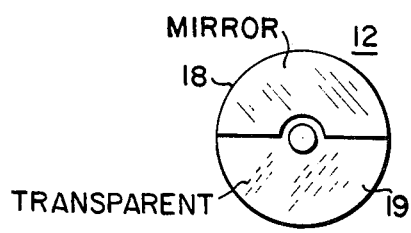
FIG. 1A and 1B are plane views of portions of FIG. 1.
Figure 1B:
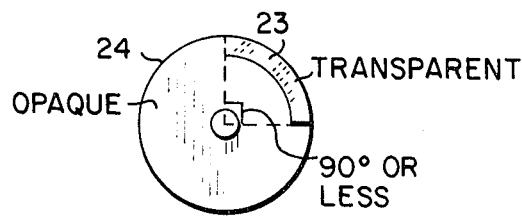

The multiplexer as illustrated in FIG. 1A is a disk having a half mirrored portion 18 and a transparent half portion 19. It is rotated by a motor 21 which also drives a decommutator shutter 22, shown in greater detail in FIG. 1B. Such shutter includes a transparent area 23 and an opaque area 24, which, by means of light-emitting diodes 26 and 27, actuate the sample and reference photodiodes 28 and 29 respectively. These provide as indicated a sample commutate signal and a reference commutate signal.

Figure 2:
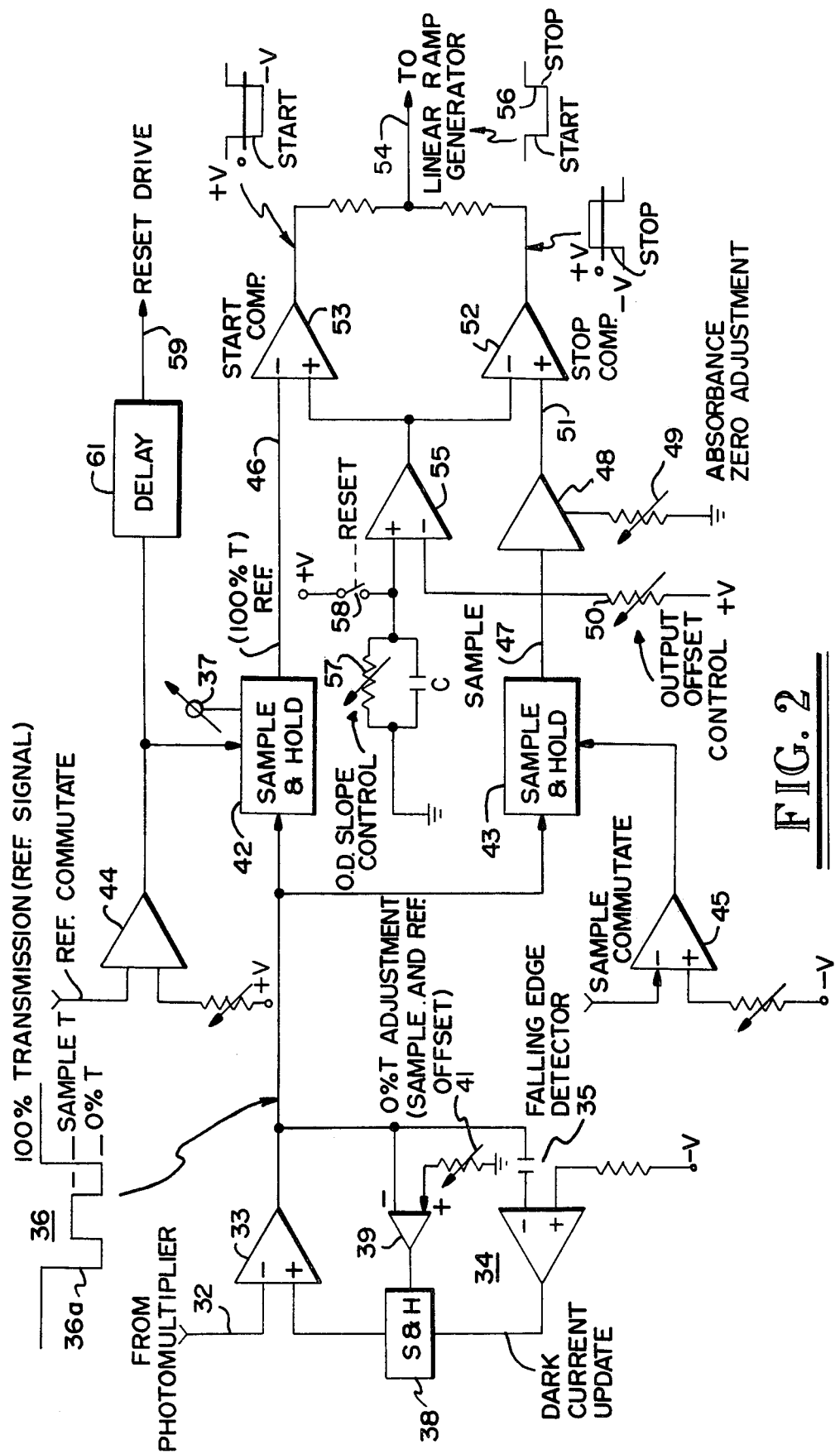
FIG. 2 is a block diagram embodying the present invention and which receives various signals from the optical arrangement of FIG. 1.

The output of photomultiplier 17 on line 32, is connected to the negative input of an amplifier 33 as illustrated by the circuit diagram of FIG. 2. A feedback circuit 34 provides for dark current compensation which in effect is a zero percent transmission adjustment. This is best illustrated by the characteristic curve 36 which shows the output of the amplifier 33 for various conditions of the optical circuit of FIG. 1. Specifically, when the source lamp 10 of FIG. 1 is illuminating the reference well 13, the reference signal is effectively a 100% transmission signal. A zero percent transmission level occurs twice during a single revolution of the multiplexer 12. These total blockages of light occur during the periods of time that the mirrored surface 18 of the commutator is blocking the reference beam's path to detector 17 and the clear part, 19, of the multiplexer 12 is not reflecting the sample beam back towards detector 17. The zero percent transmission for example, can be typically set to a negative 10 volts, by applying the proper voltage on the positive input of differential amplifier 33. This is accomplished by circuit 34 which receives the output from amplifier 33, senses the falling edge 36a by means of falling edge detector 35 to update the sample and hold circuit 38. Such sample and hold buffer amplifier is supplied a voltage by comparator 39 which receives the output voltage from amplifier 33 and compares it to the zero percent transmission adjustment potentiometer 41. This variable zero percent transmission voltage (sample and reference signal offset voltage) is the means by which stray light nonlinearities are nullified.

The composite signal 36 at the output of amplifier 33 is separated into reference and sample signals having, of course, magnitudes reflecting the transmission of the reference and sample wells, by the sample and hold circuits 42 and 43, which are updated respectively by a reference comparator 44 and a sample comparator 45. These comparators are driven respectively by the reference and sample commutate signals from photodiodes 28 and 29. Thus, on line 46 is a reference signal and on line 47 a sample signal.

Line 47 drives a variable amplifier 48 having a potentiometer 49 which is for the purpose of providing a means for zeroing the output absorbance reading of the linearizer. It effectively equalizes the outputs of the sample signal 47 and reference signals 46 so that the output of the system is zero before the specimen to be measured for the property of optical density is inserted into the sample well.

The output 51 of amplifier 48 is coupled to a stop comparator 52 and the reference signal on line 46 to a start comparator 53. The reference and sample signals are compared with the discharge voltage on a capacitor C which is coupled through an amplifier 55 to the other inputs of the comparators 52, 53. Amplifier 55 includes an output offset control potentiometer 50. Capacitor C is shunted by an optical density slope control potentiometer 57 which serves as the discharge resistor of the RC circuit. A reset switch 58, when closed, recharges capacitor C. Such reset switch is driven by a reset drive output 59 provided at the output of reference comparator 44. The reset drive includes a delay unit 61 to allow for a predetermined time delay after the reference period.

Figure 3:
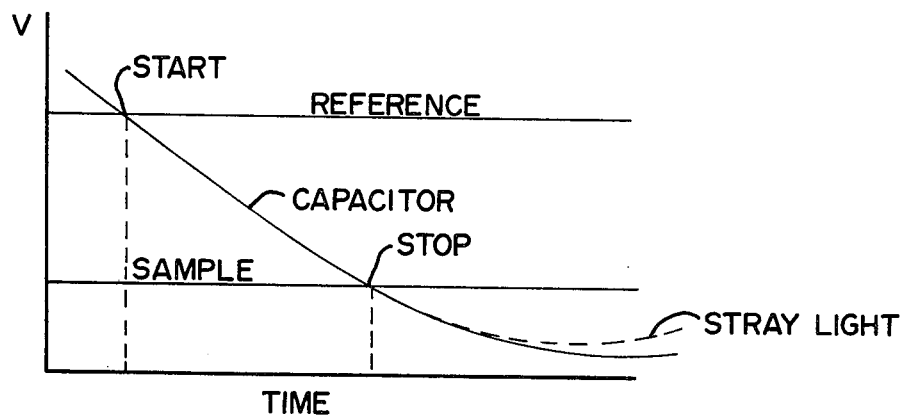
FIG. 3 is a graph useful in understanding the operation of FIG. 2.

Start and stop comparators 52 and 53 produce respectively start and stop signals as indicated, and these are combined on line 54 to produce start-stop composite signal 56. The time duration of such signal is of course indicative of the optical density of the sample. This is illustrated by FIG. 3, where the discharge curve of capacitor C is shown, the start signal occurring at the reference level and the stop signal occurring at the sample level. Also, the effective error due to stray light is indicated as effectively shifting the capacitor discharge curve. However, this is compensated for by the action of potentiometer 41.

As discussed above, such stray light may be due to room light or the lamp source 10, itself. The sample signal 47 when measuring high optical densities, will be significantly effected by this extraneous light. The reference signal 46, will not be measurably effected because of the large ratio between the value of the reference signal and the value of the present stray light signal. In other words, the stray light signal may be a significant portion of the sample signal when measuring higher optical densities. The action of potentiometer 41 adds a dc offset to both the sample signal 47 and the reference signal 46. This offset is on the order of from 10 to 100 millivolts and therefore only has an effect on the linearizer output readings in the higher O.D. (Optical Density) ranges. It has little effect on lower optical density readings because the ratio of the offset voltage with respect to the sample voltage decreases rapidly as the optical density reading approaches zero. Also there is no demonstrable effect on the reference voltage level since this signal is kept at a constant level by standard feedback means which are not included in this description.

In a somewhat similar manner to potentiometer 41, offset control potentiometer 50 provides a dc offset for the exponential discharge voltage at the input of amplifier 55 to compensate for stray light.

Figure 4:
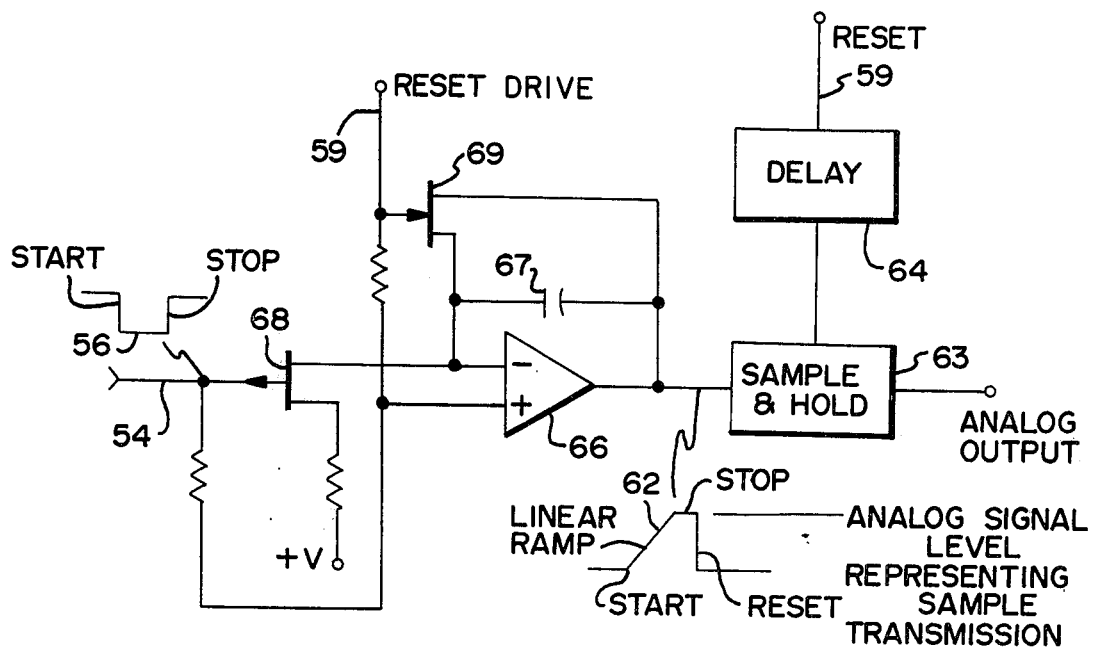
FIG. 4 is a circuit diagram showing the processing of a signal from FIG. 2.

The start-stop signal 56 drives a linear ramp generator illustrated in FIG. 4. The ramp, itself, is shown at 62. The falling edge of the composite signal 56 initiates the ramp and the rising edge terminates the ramp. The termination point of the ramp is the analog signal level which represents the optical density of the sample. This is held in sample and hold unit 63 which is updated by the reset output 59 through a delay unit 64. The linear ramp generator includes a Miller integrator having an amplifier 66 and feedback capacitor 67 which is driven by a field effect transistor 68 having its gate connected to line 54. Integrator 66, 67 is reset through a field effect transistor 69 whose gate is connected to the reset drive 59.

Thus, an improved spectrophotometer has been provided which has an analog output signal while still maintaining the accuracy of digital techniques.

As can be seen from the above description, the above technique used for converting an analog input voltage utilizing a reference voltage to an exponential analog voltage which is indicative of the difference between the reference and input voltages and then providing a linear ramp whose terminating level corresponds to such difference as modified by the exponential relationship are useful for any application in which such a conversion may be desired. In addition, extensions of these concepts can be utilized to convert analog input voltages to analog voltages which correspond to other than exponential functions such as any monotonic mathematical function. Thus, it is clear that the present invention is applicable to many fields in addition to the above described field of spectrophotometry. When used in other fields, it may be desirable to vary the reference signal on line 46 and such variability is conceptually indicated at 37.

What is claimed is:

1. Apparatus for measuring the optical density of a sample comprising: electro-optical means for measuring the light attenuating properties of said sample and producing a signal indicative of said attenuation, including a radiation source and detector to detect radiation transmitted through said sample and produce a sample signal; reference means for producing a reference signal including means for detecting radiation from said source; a resistive-capacitive circuit providing an exponential discharge voltage; means for adjusting the dc level of said sample signal relative to said exponential discharge voltage; means for comparing said reference and sample signal with the exponential discharge voltage of said resistive-capacitive circuit for producing start and stop signals respectively, the time interval between said start and stop signal being indicative of the optical density of said sample.

2. Apparatus as in claim 1 including adjustable gain amplifier means connected in front of said comparing means for adjusting the magnitude of said sample signal to adjust for zero optical density.

3. Apparatus as in claim 1 in which said means for adjusting the dc level of said sample signal relative to said exponential discharge voltage includes means for adjusting the dc offset level of said sample signal derived from said electro-optical means.

4. Apparatus as in claim 1 in which said means for adjusting the dc level of said sample signal relative to said exponential discharge voltage includes means for adjusting the dc offset level of said exponential discharge voltage.

5. Apparatus as in claim 1 including a linear ramp generator means for generating a linear analog voltage ramp an responsive to said start signal for initiating said ramp and to said stop signal for terminating said ramp, said termination level being indicative of said optical density.

6. Apparatus for measuring the optical density of a sample comprising: electro-optical means for measuring the light attenuating properties of said sample and producing a sample indicative of said attenuation, including a radiation source; a detector to detect radiation transmitted through said sample and generate a sample signal; reference means for producing a reference signal a resistive-capacitive circuit including charging means; adjustable gain amplifier means connected between said electro-optical means and said comparing means for adjusting the magnitude of said sample signal to adjust for zero optical density; means for comparing said reference and adjusted sample signal with the exponential discharge voltage of said resistive-capacitive circuit for producing start and stop signals respectively, the time interval between said start and stop signal being indicative of the optical density of said sample.

7. Apparatus as in claim 6 which includes means for adjusting the dc offset level of said sample signal derived from said electro-optical means relative to that of said exponential discharge voltage for correcting for stray light.

8. Apparatus as in claim 6 which includes means for adjusting the dc offset level of said exponential discharge voltage relative to that of said sample signal for correcting for stray light.

* * * * *